United States Patent [19]

Hall et al.

[11] 3,754,901

[45] Aug. 28, 1973

[54] EVAPORATION SOURCE FOR DEVICE METALLIZATION

[75] Inventors: Edward L. Hall; Elliott M. Philofsky, both of Phoenix, Ariz.

[73] Assignee: The United States of America as represented by the Secretary of the Army, Washington, D.C.

[22] Filed: Mar. 24, 1972

[21] Appl. No.: 237,954

[52] U.S. Cl. .................... 75/141, 117/107, 117/227

[51] Int. Cl. .................... C22c 21/02, C22c 21/04

[58] Field of Search .................... 75/141

[56] References Cited

UNITED STATES PATENTS

| | | | |
|---|---|---|---|
| 1,913,394 | 6/1933 | Joyce | 75/141 |
| 3,314,829 | 4/1967 | Sunnucks | 75/141 X |
| 3,672,878 | 6/1972 | Teubler | 75/141 |

*Primary Examiner*—L. Dewayne Rutledge
*Assistant Examiner*—E. L. Weise
*Attorney*—Harry M. Saragovitz, Edward J. Kelly et al.

[57] ABSTRACT

An evaporation source is provided for device metallization. The evaporation source, an aluminum alloy, comprises the chemical composition in percent by weight: 0.5 silicon, 0.5 iron, 3.8 to 4.9 copper, 0.3 to 0.9 manganese, 1.2 to 1.8 magnesium, 0.1 chromium, 0.25 zinc, balance aluminum.

1 Claim, No Drawings

EVAPORATION SOURCE FOR DEVICE METALLIZATION

This invention relates in general to an evaporation source for device metallization, and in particular, to an evaporation source for the contact metallization of a silicon device as for example, a silicon power transistor.

BACKGROUND OF THE INVENTION

It has been known to use aluminum as an evaporation source for the contact metallization of silicon devices as for example, a silicon power transistor. The difficulty with such a metallization is that when the device is operated at high temperature and/or high current density for extended periods of time, the metallization of the device is caused to degrade.

SUMMARY OF THE INVENTION

The general object of this invention is to provide an evaporation source for device metallization. A more particular object of the invention is to provide such an evaporation source for the metallization of a silicon device as for example, the contact metallization of a silicon power transistor.

According to this invention, a suitable evaporation source is provided comprising the chemical composition in percent by weight: 0.5 silicon, 0.5 iron, 3.8 to 4.9 copper, 0.3 to 0.9 manganese, 1.2 to 1.8 magnesium, 0.1 chromium, 0.2 zinc, balance aluminum.

BRIEF DESCRIPTION OF THE PREFERRED EMBODIMENT

The above described aluminum alloy can be conveniently deposited on a silicon device in a standard vacuum deposition unit using tungsten filaments. During the initial stages of deposition, the semiconductor substrates are masked from the metal vapors by using a shutter. Because of the different vapor pressures of the alloying elements in the aluminum alloy, the shutter can also be used to control the amount of copper and other minor constituents in the resulting alloy thin film.

The thin film metallization using the aluminum alloy has improved electromigration resistance when subjected to high temperatures and current densities. This metallization is slower to reconstruct in forming hillocks and whiskers when subjected to thermal cycling than pure aluminum metallization.

Moreover, the amount of silicon dissolution in the metallization at metal-silicon contacts is less than pure aluminum.

The deposition of the aluminum alloys results in a very fine grained metallization. Because of this extremely fine grain size, better line definition of metallization patterns on semiconductor devices is obtained.

The use of the aluminum alloy also offers a substantial cost reduction over pure aluminum.

We wish it to be understood that we do not desire to be limited to the exact details described, for obvious modifications will occur to a person skilled in the art.

What is claimed is:

1. As an evaporation source for device metallization, an aluminum alloy consisting essentially of the chemical composition in percent by weight: 0.5 silicon, 0.5 iron, 3.8 to 4.9 copper, 0.3 to 0.9 manganese, 1.2 to 1.8 magnesium, 0.1 chromium, 0.25 zinc, balance aluminum.

* * * * *